(12) United States Patent
Fajardo et al.

(10) Patent No.: US 6,847,771 B2
(45) Date of Patent: Jan. 25, 2005

(54) MICROSTRUCTURED OPTICAL FIBERS AND PREFORMS AND METHODS FOR FABRICATING MICROSTRUCTURED OPTICAL FIBERS

(75) Inventors: James C. Fajardo, Painted Post, NY (US); Michael T. Gallagher, Corning, NY (US); James A. West, Painted Post, NY (US); Natesan Venkataraman, Corning, NY (US)

(73) Assignee: Corning Incorporated, Corning, NY (US)

( * ) Notice: Subject to any disclaimer, the term of this patent is extended or adjusted under 35 U.S.C. 154(b) by 113 days.

(21) Appl. No.: 10/171,337

(22) Filed: Jun. 12, 2002

(65) Prior Publication Data

US 2003/0231846 A1 Dec. 18, 2003

(51) Int. Cl.$^7$ ................................................. G02B 6/20
(52) U.S. Cl. .......................... 385/125; 385/127; 65/428
(58) Field of Search ................................. 385/125, 127; 65/428

(56) References Cited

U.S. PATENT DOCUMENTS

| | | | |
|---|---|---|---|
| 5,164,945 A | * 11/1992 | Long et al. ..................... | 372/6 |
| 5,802,236 A | 9/1998 | DiGiovanni et al. | |
| 6,243,522 B1 | 6/2001 | Allan et al. | |
| 6,404,966 B1 | 6/2002 | Kawanishi et al. | |
| 6,444,133 B1 | 9/2002 | Fajardo et al. | |
| 2002/0012512 A1 | 1/2002 | Elrefaie et al. | |
| 2002/0126370 A1 | * 9/2002 | Broderick et al. .......... | 359/332 |

FOREIGN PATENT DOCUMENTS

| | | |
|---|---|---|
| EP | 1128195 A2 | 8/2001 |
| WO | WO02/39159 A1 | 5/2002 |

OTHER PUBLICATIONS

Furusawa et al. "Cladding pumped Ytterbium–doped fiber laser with holey inner and outer cladding", Dec.17, 2001, vol. 9, No. 13, Optics Express, pp. 714–720.
Knight et al., "New Ways to Guide Light", Apr.12, 2002, vol. 296, Science, pp. 276–277.
Bennett et al., "Toward Pratical holey fiber technology: fabrication, splicing, modeling and characterization", Sep. 1, 1999, vol. 24, No. 17, Optics Letters, pp. 1203–1205.
Fitt A D et al., "Modelling Fiber Drawing: capillary Manufacture", Conference On Lasers And Electro–Optics (CLEO 2002), Technical Digest, Postconference Edition, Long Beach, CA, May 19–24, 2002, CMD4.
Patent Abstracts of Japan, vol. 2002, No. 09, Sep. 4, 2002 & JP 2002 137931 A.
Patent Abstracts of Japan, vol. 2000, No. 25, Apr. 12, 2001 & JP 2001 220164 A.
Patent Abstracts of Japan, vol. 2002, No. 05, May 3, 2002 & JP 2002 029769 A.
Patent Abstracts of Japan, vol. 2003, No. 01, Jan. 14, 2003 & JP 2002 277667A.

\* cited by examiner

*Primary Examiner*—Rodney Bovernick
*Assistant Examiner*—Sung Pak
(74) *Attorney, Agent, or Firm*—James V. Suggs; Kevin M. Able

(57) ABSTRACT

A microstructured optical fiber is described. The microstructured optical fiber comprises an inner region and an outer region. The inner region includes an inner material and a plurality of holes formed in the inner material. The outer region surrounds the inner region, and includes an outer material. The softening point temperature of the inner material is greater than the softening point temperature of the outer material by at least about 50° C. Microstructured optical fiber preforms and methods for making the microstructured optical fibers are also described. The microstructured optical fiber may be made to have substantially undistorted holes in the inner region.

38 Claims, 8 Drawing Sheets

MICROSTRUCTURED OPTICAL FIBERS AND PREFORMS AND METHODS FOR FABRICATING MICROSTRUCTURED OPTICAL FIBERS

BACKGROUND OF THE INVENTION

1. Field of the Invention

The present invention relates generally to optical fibers, and more specifically to microstructured optical fibers and methods and preforms for drawing microstructured optical fibers.

2. Technical Background

Optical fibers formed completely from glass materials have been in commercial use for more than two decades. Although such optical fibers have represented a quantum leap forward in the field of telecommunications, work on alternative optical fiber designs continues. One promising type of alternative optical fiber is a microstructured optical fiber, which includes holes or voids running longitudinally along the fiber axis. The holes generally contain air or an inert gas, but may also contain other materials.

Microstructured optical fibers may be designed to have a wide variety of properties, and may be used in a wide variety of applications. For example, microstructured optical fibers having a solid glass core and a plurality of holes disposed in the cladding region around the core have been constructed. The position and sizes of the holes may be designed to yield microstructured optical fibers with dispersions ranging anywhere from large negative values to large positive values. Such fibers may be useful, for example, in dispersion compensation. Solid-core microstructured optical fibers may also be designed to be single mode over a wide range of wavelengths. Most solid-core microstructured optical fibers guide light by a total internal reflection mechanism; the low index of the holes acts to lower the effective index of the cladding region in which they are disposed.

One especially interesting type of microstructured optical fiber is the photonic band gap fiber. Photonic band gap fibers guide light by a mechanism that is fundamentally different from the total internal reflection mechanism. Photonic band gap fibers have a photonic crystal structure formed in the cladding of the fiber. The photonic crystal structure is a periodic array of holes having a spacing on the order of the wavelength of light. The core of the fiber is formed by a defect in the photonic crystal structure cladding. For example, the defect may be a hole of a substantially different size and/or shape than the holes of the photonic crystal structure. The photonic crystal structure has a range of frequencies, known as the band gap, for which light is forbidden to propagate in the photonic crystal structure. Light introduced into the core of the fiber having a frequency within the band gap will be forbidden from propagating in the photonic crystal cladding, and will therefore be confined to the core. A photonic band gap fiber may have a core that is formed from a hole larger than those of the photonic crystal structure; in such a hollow-core fiber, the light may be guided in a gaseous medium, lowering losses due to absorption and Rayleigh scattering of glass materials. As the light is guided in a gaseous medium, hollow-core fiber may have extremely low non-linearity.

The fabrication of microstructured optical fibers uses methods roughly analogous to the manufacture of all-glass optical fiber. A preform having the desired arrangement of holes is formed, then drawn into fiber using heat and tension. In the drawing process, the size, shape, and arrangement of the holes may be significantly distorted due to the softness of the material and surface tension inside the holes. Such distortions may be especially damaging in hollow-core photonic band gap fiber, as the band gap may be quite sensitive to variations in characteristic dimensions of the photonic crystal structure such as hole size, pitch and symmetry.

There remains a need for methods of fabrication of microstructured optical fiber that allow for control of the microstructure of the fiber.

SUMMARY OF THE INVENTION

One aspect of the present invention relates to a microstructured optical fiber for the propagation of an optical signal having a desired wavelength, the microstructured optical fiber including an inner region including an inner material and a plurality of holes formed in the inner material, the inner material having a refractive index at the desired wavelength and a softening point temperature; and an outer region surrounding the inner region, the outer region including an outer material, the outer material having a refractive index at the desired wavelength and a softening point temperature, wherein the softening point temperature of the inner material is greater than the softening point temperature of the outer material by at least about 50° C.

Another aspect of the present invention relates to a microstructured optical fiber preform for the fabrication of a microstructured optical fiber, the microstructured optical fiber being for the propagation of an optical signal at a desired wavelength, the microstructured optical fiber preform including an inner region including an inner material and a plurality of holes formed in the inner material, the inner material having a refractive index at the desired wavelength and a softening point temperature; and an outer region surrounding the inner region, the outer region including an outer material, the outer material having a refractive index at the desired wavelength and a softening point temperature, wherein the softening point temperature of the inner material is greater than the softening point temperature of the outer material by at least about 50° C.

Another aspect of the present invention relates to a method of making a microstructured optical fiber, comprising the steps of providing a preform, the preform having an inner region including an inner material and a plurality of holes formed in the inner material, the inner material having a refractive index at the desired wavelength and a softening point temperature, and an outer region surrounding the inner region, the outer region including an outer material, the outer material having a refractive index at the desired wavelength and a softening point temperature wherein the softening point temperature of the inner material is greater than the softening point temperature of the outer material by at least about 50° C.; and drawing the preform to form the microstructured optical fiber.

Another aspect of the present invention relates to an optical communications system including a microstructured optical fiber including an inner region including an inner material and a plurality of holes formed in the inner material, the inner material having a refractive index at the desired wavelength and a softening point temperature; and an outer region surrounding the inner region, the outer region including an outer material, the outer material having a refractive index at the desired wavelength and a softening point temperature, wherein the softening point temperature of the inner material is greater than the softening point temperature of the outer material by at least about 50° C.

The optical fibers, methods and preforms of the present invention result in a number of advantages over conventional optical fibers, methods and preforms. The present invention enables the fabrication of microstructured optical fibers having substantially undistorted microstructures in the inner region of the fiber. As propagation in microstructured optical fibers may be quite sensitive to distortions in the inner region of the fiber, the microstructured optical fibers of the present invention may have substantially better optical properties than conventional microstructured optical fibers. Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale. The drawings illustrate one or more embodiment(s) of the invention, and together with the description serve to explain the principles and operation of the invention.

DEFINITION

The following definition is in accord with common usage in the art.

Delta, $\Delta$, is the relative refractive index percent, $\Delta = (n_i^2 - n_0^2)/2n_0^2$, where $n_i$ is the refractive index of the inner material, and no is the refractive index of the outer material. Deltas are conventionally expressed as percents.

DETAILED DESCRIPTION OF THE INVENTION

Reference will now be made in detail to presently preferred embodiments of the invention, examples of which are illustrated in the accompanying drawings.

The inventors have determined that undesirable distortion during drawing of the fiber of particular microstructures of the optical fiber may be inhibited if the region near and around those microstructures includes material with a relatively high softening point temperature compared to the rest of the fiber. The higher softening point temperature material allows the region near the microstructures to remain relatively firm during drawing, and thus the microstructures, although of course reducing in size during drawing, are otherwise substantially inhibited from distorting.

Optical fibers of the present invention include a high softening point temperature region (e.g. the region near and around the microstructures) and a low softening point temperature region (e.g. a region removed from the microstructures). The low softening point temperature region allows the actual fiber drawing temperature to be reduced from the minimum drawing temperature that would be required if the fiber contained only the high softening point temperature material. As the relative mass of the low softening point temperature material is increased (i.e., as the ratio of masses of the low to the high softening point temperature materials is increased), the required actual drawing temperature is lowered. The viscosity of the high softening point temperature material remains high enough at the actual drawing temperature to inhibit distortion of the microstructures formed from the high softening point temperature material.

The higher softening point temperature material can remain relatively firm during the draw if the softening point temperature difference between the materials is sufficient. The softening point temperature of a material is the temperature at which the material reaches a viscosity of about $10^{7.6}$ poise. The softening point temperature of the higher softening point temperature material should be greater than the softening point temperature of the lower softening point temperature material by at least about 50° C. More preferably the softening point temperature of higher softening point temperature material is greater than the softening point temperature of lower softening point temperature material by at least about 100° C., and most preferably by at least about 150° C.

Figure 1:
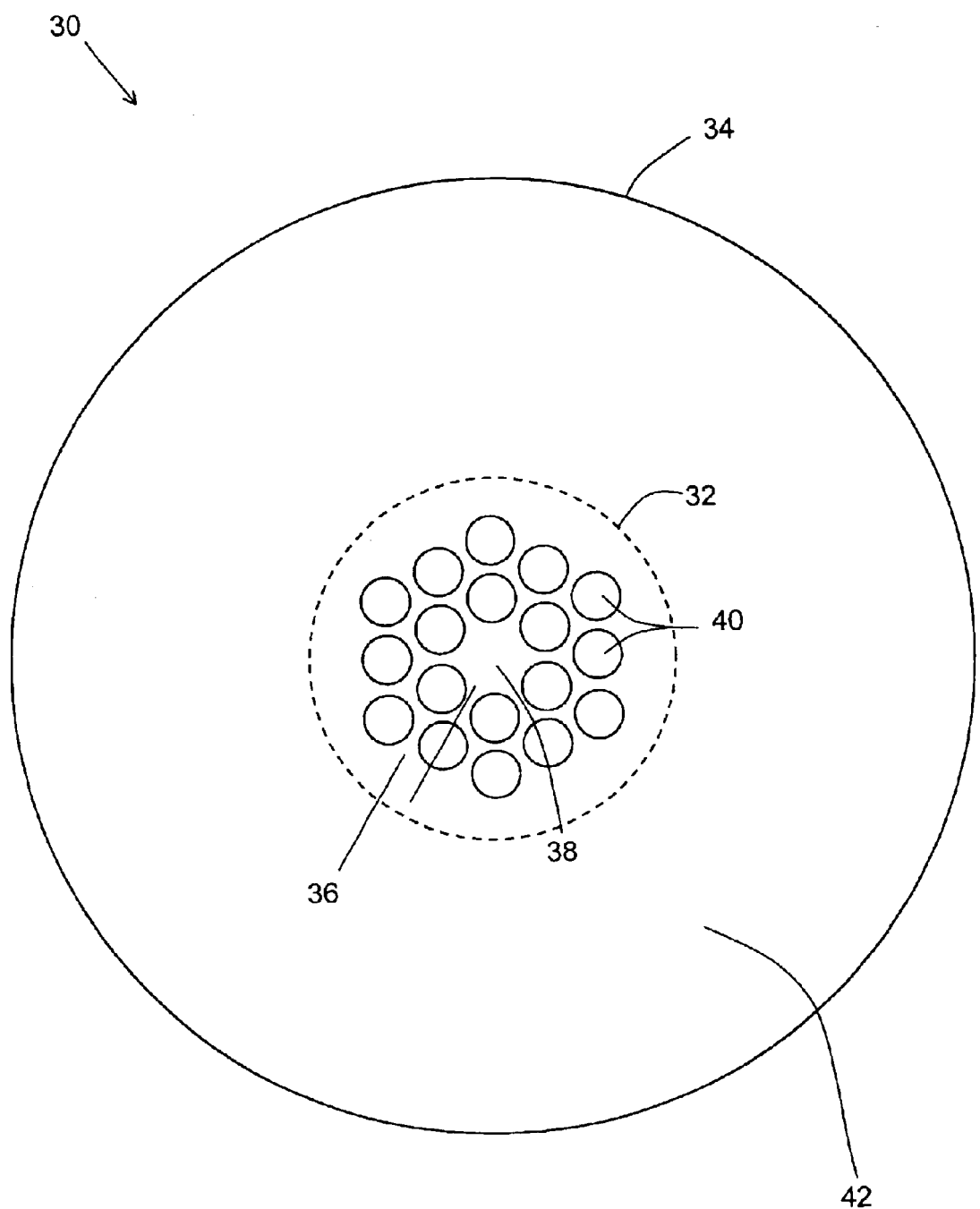
FIG. 1 is a cross-sectional view of a microstructured optical fiber according to one embodiment of the present invention.

In one aspect of the present invention, a microstructured optical fiber is provided. The microstructured optical fiber includes an inner region including an inner material and a plurality of holes formed in the inner material. The microstructured optical fiber also includes an outer region surrounding the inner region, the outer region including an outer material. The softening point temperature of the inner material is at least 50° C., preferably at least 100° C., and more preferably at least 150° C. greater than the softening point temperature of the outer material. An example of a microstructured optical fiber according to this aspect of the invention is shown in cross-sectional view in FIG. 1. The fiber 30 of FIG. 1 is an effective index-guided microstructured optical fiber having an inner region 32 and an outer region 34. Inner region 32 is formed from an inner material 36, and includes a solid core 38, as well as a plurality of holes 40 formed in the inner material. Outer region 34 is formed from an outer material 42. In this embodiment of the invention, outer material 42 has no holes formed therein. The inner material 36 has a softening point temperature at least 50° C. greater than the softening point temperature of the outer material 42. The embodiment of FIG. 1 has advantages in manufacturing in that only a single solid tube need be used to provide the material of the outer region 34.

Figure 2:
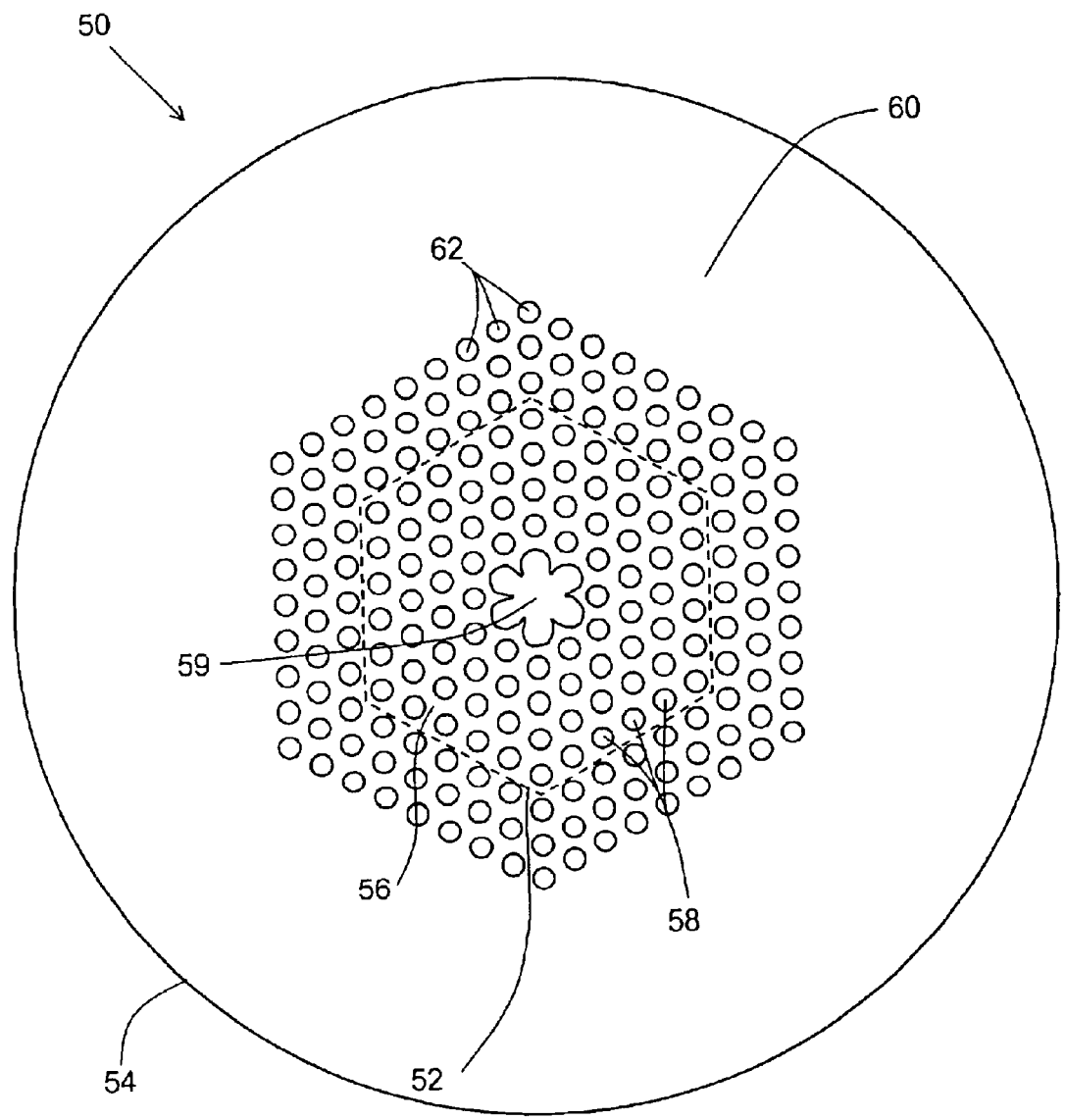
FIG. 2 is a cross-sectional view of a microstructured optical fiber according to another embodiment of the present invention.

FIG. 2 is a cross-sectional view of another example of a microstructured optical fiber 50 according to an aspect of the present invention. In this embodiment of the invention, the microstructured optical fiber is a photonic band gap fiber. The fiber 50 has a hexagonal lattice structure; i.e., the holes are positioned approximately at the lattice positions of a hexagonal lattice structure. The microstructured optical fiber 50 includes an inner region 52 and an outer region 54. The inner region 52 is formed from an inner material 56, and includes a plurality of holes 58 formed in the inner material, as well as a hollow core 59. The hollow core is formed as an enlarged hole in the inner material. In this embodiment, the inner region 52 includes the hollow core and four rings of surrounding lattice positions. The skilled artisan will recognize that the term "ring" as used herein is not meant to imply a circular arrangement; in this example, the ring has a hexagonal geometry. Of course, the inner region may include more or less than four rings of lattice positions, such as two rings, for example. The approximate extent of the inner region 52 is shown enclosed by a dashed line. The outer region 54 surrounds the inner region 52, and is formed from an outer material 60. In this example, the outer region 54 includes a set of holes 62 formed in the outer material at the lattice positions immediately surrounding those of the inner region 52. FIG. 2 illustrates the outer region 54 as having three rings of lattice positions surrounding the inner region 52. Of course, the outer region 54 may include more or less than three rings of lattice positions surrounding the inner region 52, such as five rings, for example. The inner material 56 has a softening point temperature at least 50° C. greater than the softening point temperature of the outer material 60. While the holes of the outer region may become somewhat distorted (i.e. have acircular cross-section) during drawing of the fiber of FIG. 2, the holes of the inner region will be more likely to remain substantially undistorted. As the holes of the outer region have relatively little contact with an optical signal propagating in the fiber, any distortions of the holes of the outer region are of little consequence.

The microstructured optical fibers of the present invention include holes, such as the holes 58 and 62 of the inner and outer regions of the example of FIG. 2. The holes are preferably elongated annular passages that extend substantially parallel to the longitudinal axis of the fiber. The diameter of the holes may be, for example, between 0.5 and 5.0 microns. The holes may be filled with gas or another material that has a different index of refraction than the material surrounding the holes. As another alternative, there may be a vacuum within the holes.

The microstructured optical fibers of the present invention also include a core. As used herein, a core is a physical feature having a structure that causes light to be propagated substantially within its boundary. For example, the index-guided optical fiber 30 of FIG. 1 includes a solid core 38 formed at the center of the rings of holes 40. The solid core may be formed from the inner material, as is shown in FIG. 1, or may be formed from a different material. The photonic band gap optical fiber 50 of FIG. 2 includes a hollow core 59 formed as an enlarged hole at the center of the hexagonal lattice. The hollow core may be formed as a hole in the material of the inner cladding, or may be formed as a hole in a different material. Light propagating in the fiber is confined substantially to the core. In the embodiments of FIGS. 1 and 2, there is only one core located at the center of the fiber. However, as the skilled artisan will appreciate, the optical fibers of the present invention may include multiple cores. While it is preferable that the core of the optical fiber be located along the central axis of the fiber, the core(s) may be located at position(s) other than along the central axis of the fiber.

In the microstructured optical fibers of the present invention, undesirable distortion of the holes of the inner region may be inhibited during drawing by appropriate selection of the properties of the inner and outer materials. In particular, the inner material has a higher viscosity than the viscosity of the outer material at the drawing temperature, i.e., the temperature at which the fiber was drawn. The viscosities of the materials at the drawing temperature is directly correlated with the softening point temperatures of the materials. Hence, a material with a higher softening point temperature will have a higher viscosity at the drawing temperature, and holes formed in that material will experience less distortion during the draw. In the microstructured fibers of the present invention, the inner material of the inner region has a softening point temperature of at least about 50° C. greater, preferably at least about 100° C. greater, and more preferably at least about 150° C. greater than the softening point temperature of the outer material of the outer region. In order to gain the greatest benefit of the difference in softening point temperatures, it is preferable that the mass of the outer region be greater than the mass of the inner region. More preferably, the mass of the outer region is at least about three times the mass of the inner region. Even more preferably, the mass of the outer region is at least about six times the mass of the inner region. In some embodiments of the present invention, the mass of the outer region may be even greater than about fifty times the mass of the inner region.

The optical fibers of the present invention may be formed from a variety of materials, such as silica glasses, doped silica glasses (e.g. germanosilicate glasses, borosilicate glasses, aluminosilicate glasses, fluorosilicate glasses), fluoride glasses, chalcogenide glasses, and heavy metal oxide glasses. As the skilled artisan will appreciate, the higher softening point temperature of the inner material can be achieved in a variety of ways. For example, the inner and outer materials may be substantially different materials that provide the desired viscosity and softening point temperature relationship. Alternatively, the higher softening point temperature of the inner material can be achieved by relative doping of similar inner and outer materials using techniques familiar to the skilled artisan. For example, a silica glass outer material, may be doped with a softening point temperature reducing dopant, such as fluorine, germanium, boron, and/or phosphorous. Alternatively, a silica glass inner material may be doped with a softening point temperature increasing dopant, such as tantalum, and/or nitrogen. As yet another alternative, the inner material may be doped to raise its softening point temperature and the outer material also be doped to lower its softening point temperature.

In the embodiment of FIG. 2, both the inner material 56 and the outer material 60 may have substantially the same index of refraction. Beneficially, the inner and outer regions 52 and 54 of fiber 50 have consistent photonic band gap properties if the inner material 56 and the outer material 60 have substantially the same index of refraction. In this case, it may be preferable that the absolute value of the delta between the inner and outer materials 56 and 60 be less than about 0.4% at the desired wavelength. Thus, overall the inner and outer regions 52 and 54 comprise a combined region with a medium of constant index of refraction, i.e., inner and outer materials 56 and 60, and holes 58 and 62 with a different index of refraction. In other embodiments of the present invention (e.g. the index-guided microstructured optical fiber of FIG. 1), it may be desirable for the inner material 56 and the outer material 60 to not have substantially the same index of refraction.

Doping a material with a softening point temperature modifying dopant may change the index of refraction of material. Thus, compensation doping may be required to maintain the index of refraction of the inner and outer materials to be substantially the same. The compensation may, for example, yield inner and outer materials having an absolute value of delta of less than about 0.4%. For example, if the inner material is doped with tantalum to increase the softening point temperature, its index of refraction will increase. The outer material is preferably doped (e.g. with germanium) to increase its index of refraction to be substantially equal to that of the inner material. Of course, if the outer material is doped to change viscosity, the inner material may need to be doped to maintain the index of refraction of the inner and outer materials to be substantially the same. Alternatively, only the outer material may be doped both to decrease softening point temperature and to compensate for index of refraction changes due to the softening point temperature modifier. Thus, the inner material may be essentially undoped silica, and the outer material may be doped with germanium (increases index while decreasing softening point temperature) and fluorine (decreases index while decreasing softening point temperature).

Figure 3:
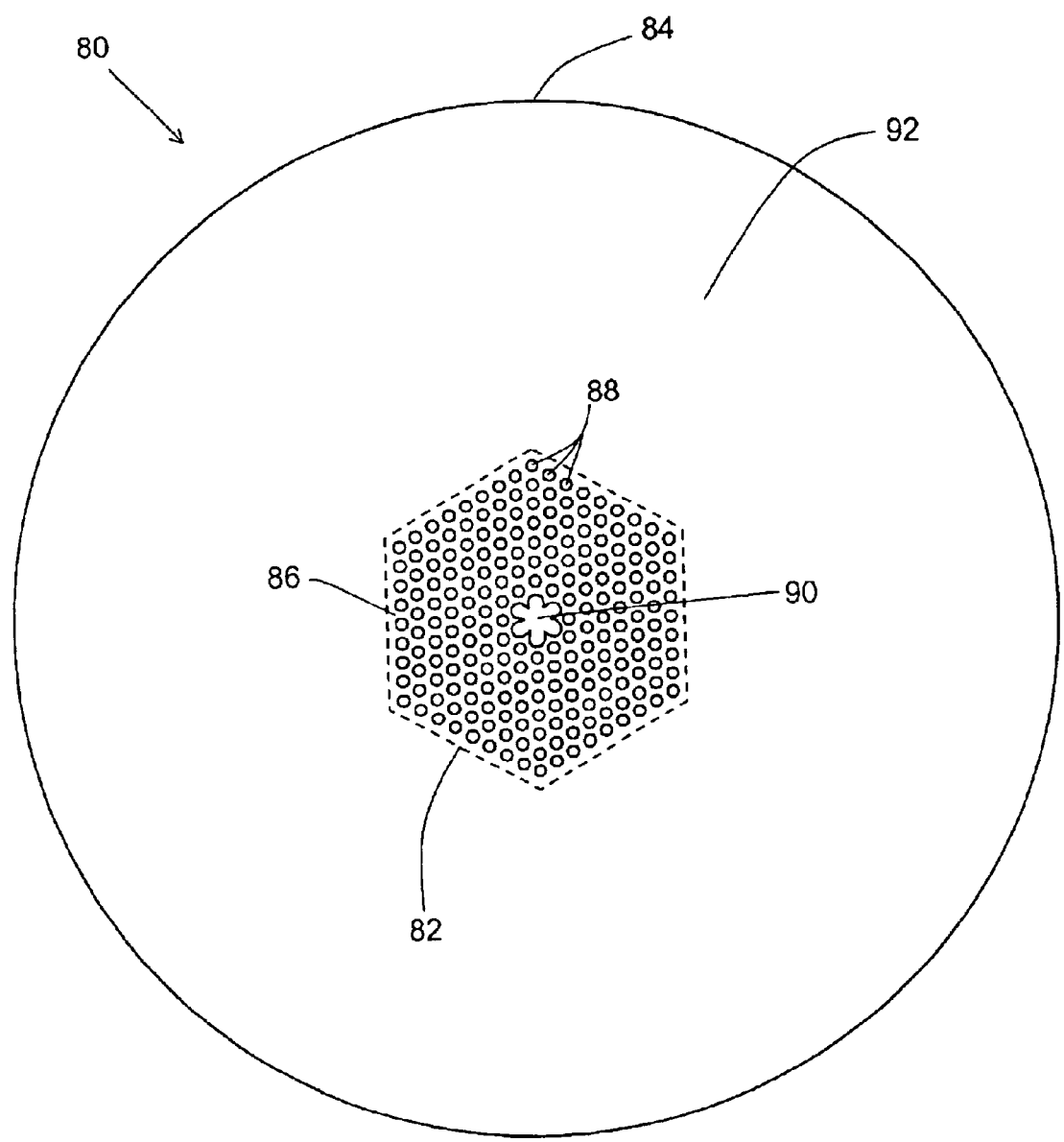
FIG. 3 is a cross-sectional view of a microstructured optical fiber according to another embodiment of the present invention.

FIG. 3 illustrates another preferred embodiment of the invention, which is similar in many respects to the embodiment of FIG. 2. Microstructured optical fiber 80 has an inner region 82 and an outer region 84. Inner region 82 is formed from inner material 86 and has the holes 88 of a photonic crystal structure and a core hole 90 formed therein. Outer region 84 is formed from outer material 92, and has substantially no holes formed therein. The inner material 86 has a softening point temperature at least 50° C. greater than the softening point temperature of the outer material 92. While in this embodiment, there are seven rings of holes surrounding the core in the inner region, the large relative mass of the outer region may allow the fiber to be drawn without substantial distortion of the holes of the inner region.

In the microstructured optical fibers of the present invention, it is preferable that the outer material be substantially in contact with an outer surface of the inner material. For example, the outer material is preferably in contact with at least about 80%, and more preferably at least about 90% of an outer surface of the inner material. Large gaps between the inner material and the outer material will tend to disturb the light-guiding properties, compromise the mechanical strength, and inhibit facile splicing of the microstructured optical fiber.

In the microstructured optical fibers of the present invention, the inner region is preferably disposed substantially along the central axis of the fiber. It may be especially desirable to have the core disposed substantially along the central axis of the fiber. Centering of the inner region and/or the core will allow for these features to be easily located using mechanical alignment methods.

As the skilled artisan will appreciate, other arrangements of holes and solid regions may be used in the optical fibers of the present invention. For example, more or less holes may be used, and regions of different refractive index may be formed. While the microstructured optical fibers described above with reference to FIGS. 1–4 have hexagonal lattices, other geometries, such as square or triangular, may be used. The skilled artisan may choose other material systems and other microstructure shapes for use in the fibers of the present invention.

The microstructured optical fibers of the present invention may be designed and fabricated to operate at a wide variety of desired wavelengths. For example, the microstructured optical fibers of the present invention may be operable at ultraviolet, visible, near infrared or far infrared wavelengths. Especially desirable wavelengths include 1300 nm and 1550 nm. The skilled artisan will recognize that the microstructured optical fibers of the present invention may be designed for use at wavelengths other than those mentioned specifically herein.

In another aspect of the present invention, a microstructured optical fiber preform for the fabrication of a microstructured optical fiber is provided. The microstructured optical fiber includes an inner region including an inner material and a plurality of holes formed in the inner material. The microstructured optical fiber also includes an outer region surrounding the inner region, the outer region including an outer material. The softening point temperature of the inner material is at least 50° C., preferably at least 100° C., and more preferably at least 150° C. greater than the softening point temperature of the outer material.

As the skilled artisan will recognize, the microstructured optical fiber preforms of the present invention will be structurally analogous to the microstructured optical fibers of the present invention as described above. For example, at a desired wavelength, the inner and outer materials may have an absolute value of delta of less than about 0.4% of one another. The outer material may be in substantial contact with an outer surface of the inner material. The inner material may be disposed substantially along the central axis. The skilled artisan will apply the teachings of this disclosure with respect to the microstructured optical fiber to the microstructured optical fiber preform of this aspect of the invention.

Figure 4:
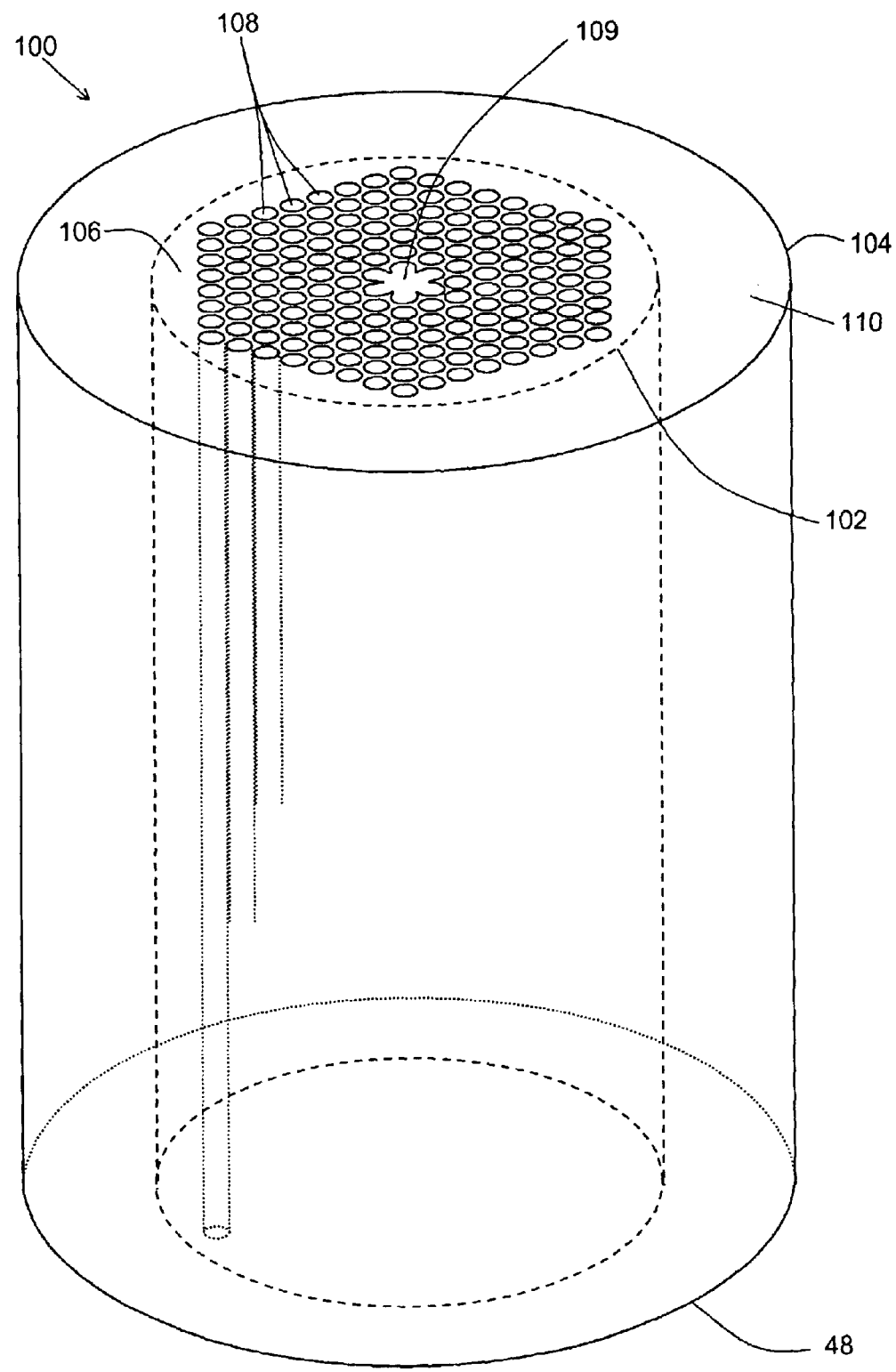
FIG. 4 is a perspective view of a microstructured optical fiber preform according to an embodiment of the present invention.

An example of a microstructured optical fiber perform according to this aspect of the invention is shown in perspective view in FIG. 4. This optical fiber preform is suitable for the fabrication of a photonic band gap fiber similar to the example of FIG. 3. The microstructured optical preform 100 includes an inner region 102 and an outer region 104. The inner region 102 is formed from an inner material 106, and includes a plurality of holes 108 formed in the inner material, as well as a hollow core 109. The hollow core is formed as an enlarged hole in the inner material. In this embodiment, the inner region 102 includes the hollow core and six rings of surrounding lattice positions. Of course, the inner region may include more or less than six rings of lattice positions, such as two rings, for example. The approximate extent of the inner region 102 is shown enclosed by a dashed line. The outer region 104 surrounds the inner region 102, and is formed from an outer material 110. The inner material 106 has a softening point temperature at least 50° C. greater than the softening point temperature of the outer material 110.

Another aspect of the present invention provides a method of making a microstructured optical fiber. A microstructured optical fiber preform substantially as described above is provided. The microstructured optical fiber includes an inner region including an inner material and a plurality of holes formed in the inner material. The microstructured optical fiber also includes an outer region surrounding the inner region, the outer region including an outer material. The softening point temperature of the inner material is at least 50° C., preferably at least 100° C., and more preferably at least 150° C. greater than the softening point temperature of the outer material. The microstructured optical fiber preform is drawn into a microstructured optical fiber.

The temperature at which the drawing step is performed may be selected by the skilled artisan to minimize distortion of the holes of the inner region during the draw. For a given microstructured optical fiber preform geometry and at a given set of draw conditions (e.g. draw tension, draw speed), the inner material is characterized by a first drawing temperature. The first drawing temperature is the minimum temperature needed to draw into fiber under the given set of draw conditions an microstructured preform having the given geometry and formed solely from the inner material. Likewise, the outer material is characterized by a second drawing temperature. The second drawing temperature is the minimum temperature needed to draw into fiber under the given set of draw conditions an microstructured preform having the given geometry and formed solely from the outer material. Because the softening point temperature of the outer material is less than the softening point temperature of the inner material, the first drawing temperature will be greater than that of the second drawing temperature. The actual drawing temperature of a microstructured optical fiber preform including both the inner material and the outer material will be between the first and second drawing temperatures. It is preferable that the mass of the outer material be substantially greater than the mass of the inner material. In this way, due to the relatively large mass of the outer material, the actual drawing temperature may be substantially closer to the lower second drawing temperature than to the higher first drawing temperature. When the actual drawing temperature is substantially closer to the lower second drawing temperature, the viscosity of the inner material remains high enough at the actual drawing temperature to prevent substantial distortion of the holes of the first region. In other words, the inner material remains harder during the draw due to its relatively high viscosity at the actual draw temperature, and the increased hardness prevents the holes of the inner region from becoming substantially distorted during the draw into a fiber.

Figure 5:
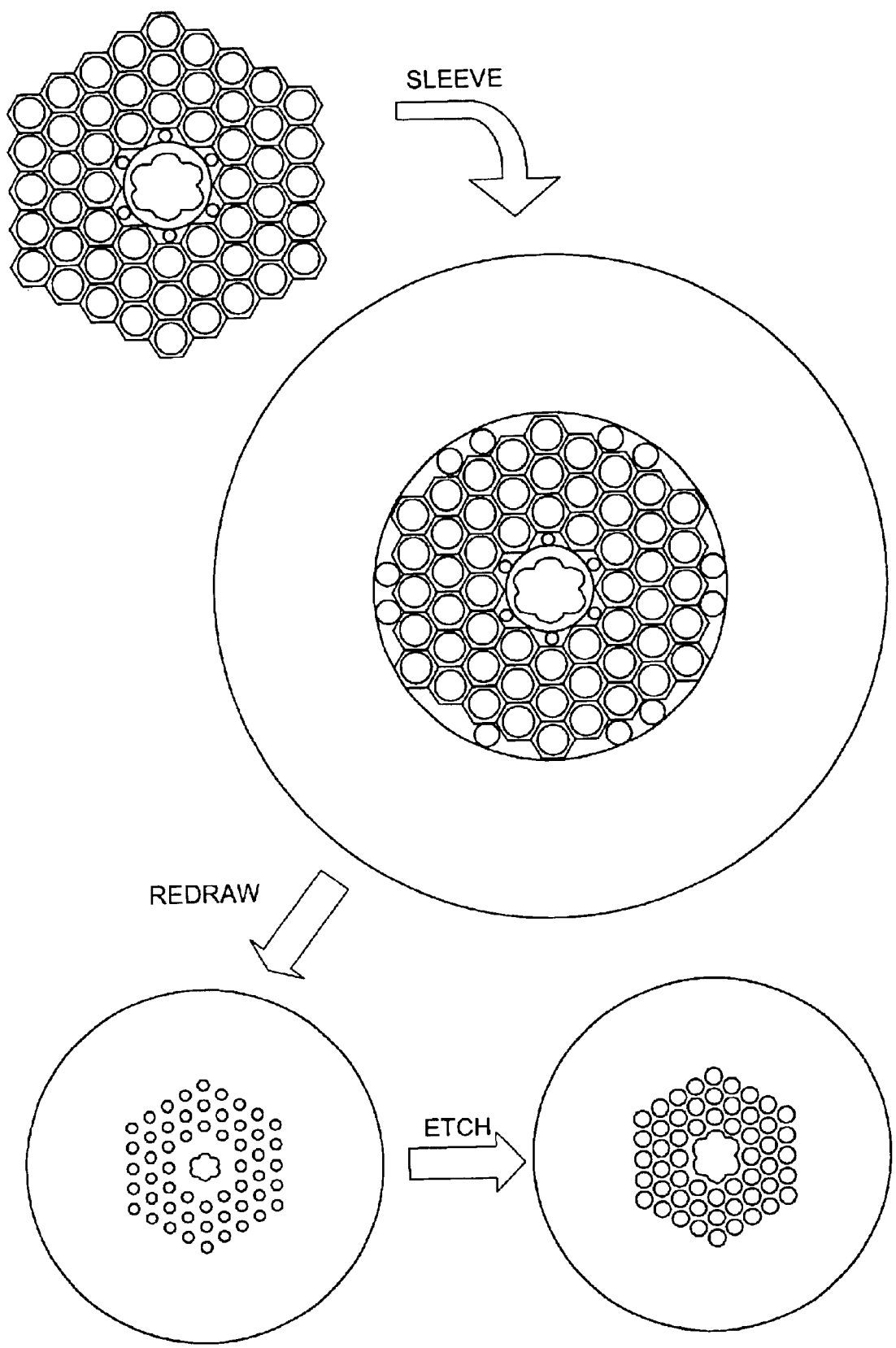
FIG. 5 is a schematic diagram of an example of a stack-and-draw method for making a microstructured optical fiber.

The microstructured optical fiber preforms of the present invention may be made using methods familiar to the skilled artisan. In the commonly used stack-and-draw process, hollow capillaries are bundled together to form the microstructured preform. An example of a stack-and-draw process for the production of a microstructured optical fiber is shown in cross-sectional view in FIG. 5. A group of hollow capillaries is arranged to define the desired microstructure (e.g. a photonic crystal structure having a hollow core defect). The bundle of capillaries may be sleeved by a solid tube, and may optionally be redrawn to reduce the preform diameter and etched with $SF_6$ or aqueous $NH_4F.HF$ to enlarge the size of the holes. Redraw and etching procedures are described, for example, in U.S. patent application Ser. No. 09/563,390, which is incorporated herein by reference.

Figure 6:
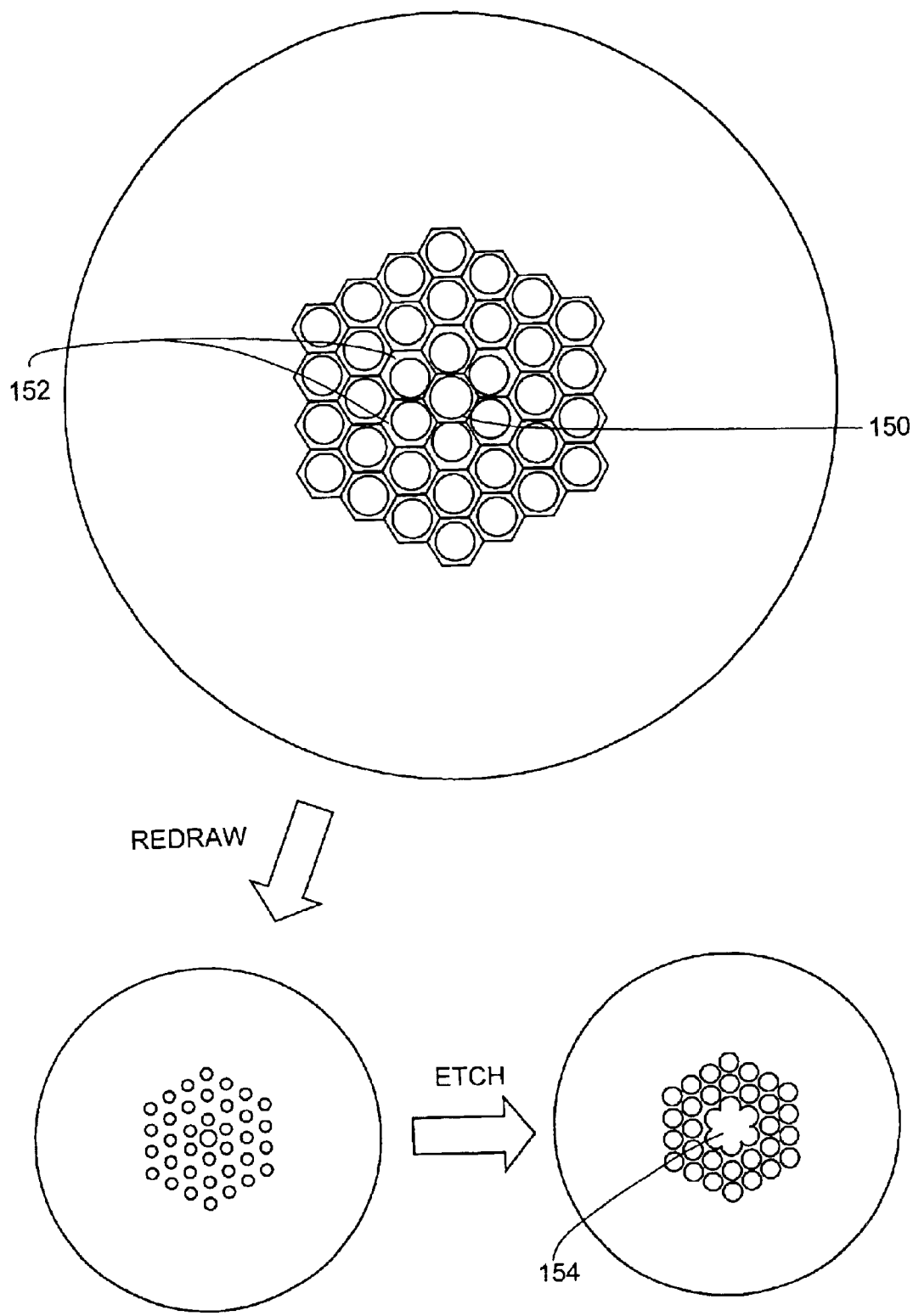
FIG. 6 is a schematic diagram of an example of an etching process used to enlarge the core defect in a photonic band gap fiber preform.

The core of the microstructured optical fiber preform may be constructed in a variety of ways. For example, to make a solid-core microstructured optical fiber, the core may be formed by a solid rod arranged among the hollow capillaries. To make a hollow-core microstructured optical fiber, a capillary 150 having a larger inner cross-section may be inserted into the structure. The defect may be enlarged during the etching step by surrounding the central capillary with capillaries having an offset hole 152, as shown in FIG. 6 and described in U.S. patent application Ser. No. 10/085,785, which is incorporated herein by reference. The etching step can be performed to remove the relatively thin walls between the offset capillaries and the central capillary, enlarging the hole 154. The protruding structures may partially or completely recede into the wall of the defect during the draw due to surface tension. Alternatively, a shaped core capillary may be provided by deposition of glass soot onto a specially-shaped graphite bait rod followed by consolidation of the soot and physical and/or chemical removal of the bait rod.

As the skilled artisan will appreciate, other methods of constructing preforms for microstructured optical fibers may be used advantageously in the present invention. For example, an extrusion process may be used to form the preform. Other etching and drawing techniques familiar to the skilled artisan may likewise be used in conjunction with the present invention.

The microstructured optical fiber preforms may be drawn into microstructured optical fiber using methods familiar to the skilled artisan. For example, a pressure may be placed on the holes of the preform during the draw in order to keep them from closing due to surface tension. It may be desirable to place different pressures on different sets of holes of the preform, as is described in commonly owned U.S. patent application Ser. No. 10/171,335, inventors Dawes, Gallagher, Hawtof, Venkataraman) filed on even date herewith and entitled "METHODS AND PREFORMS FOR DRAWING MICROSTRUCTURED OPTICAL FIBERS", which is incorporated herein by reference. For example, the large core hole of a photonic band gap fiber may be coupled to a first pressure system, and the holes of the photonic crystal structure may be coupled to a second pressure system. The first pressure system may be set to a lower pressure than the second pressure system so that the inner core hole does not expand relative to the holes of the photonic crystal structure.

Another aspect of the present invention relates to an optical communications system including the microstructured optical fiber of the present invention. The microstructured optical fibers of the present invention may be made with substantially less distortion than conventional microstructured optical fibers, and therefore may have considerably better optical performance than conventional microstructured optical fibers. As such, the microstructured optical fibers of the present invention are especially suited for use in optical communications systems.

The invention will be further clarified by the following non-limiting example which is intended to be exemplary of the invention.

EXAMPLE 1

Figure 7:
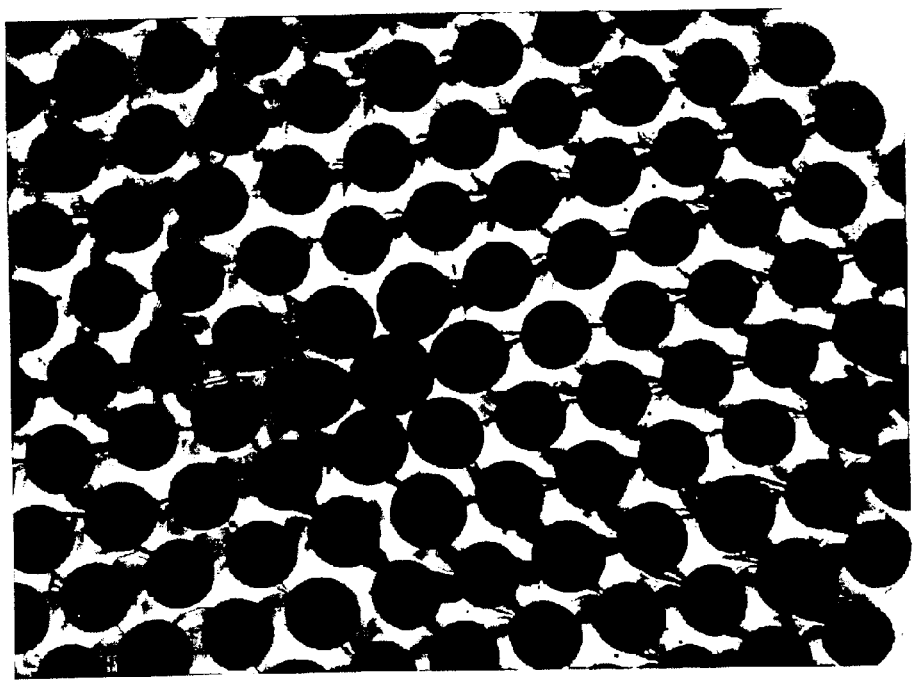
FIG. 7 is an end view of a microstructured optical fiber preform formed from a single material.
Figure 8:
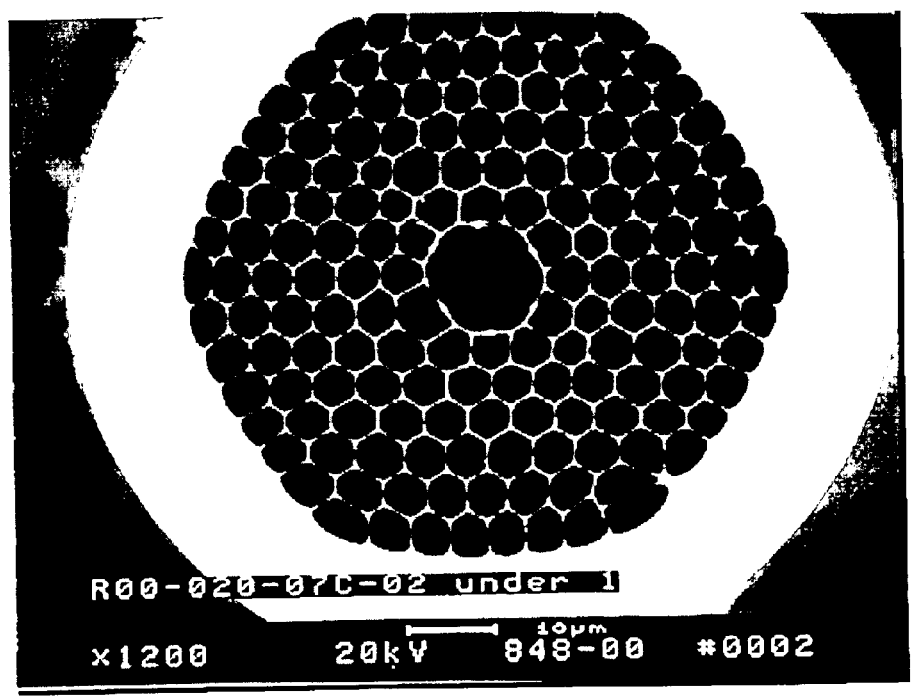
FIG. 8 is an end view of a microstructured optical fiber formed from a single material.

A microstructured optical fiber preform was constructed by stacking undoped silica capillaries, sleeving them in an undoped silica tube to form a bundle, drawing the bundle to reduce its size, and etching with aqueous $NH_4F.HF$ to enlarge the holes, as described above. An end view of a central region of the preform is shown in FIG. 7. This preform was drawn into optical fiber at a furnace temperature of 1950° C. The optical fiber drawn from the preform of FIG. 7 is shown in end view in FIG. 8. The holes of this fiber are substantially distorted compared to the holes of the preform. For example, the protruding ribs of the core hole have disappeared, and many of the holes of the photonic crystal cladding structure are substantially distorted from circular.

Figure 9:
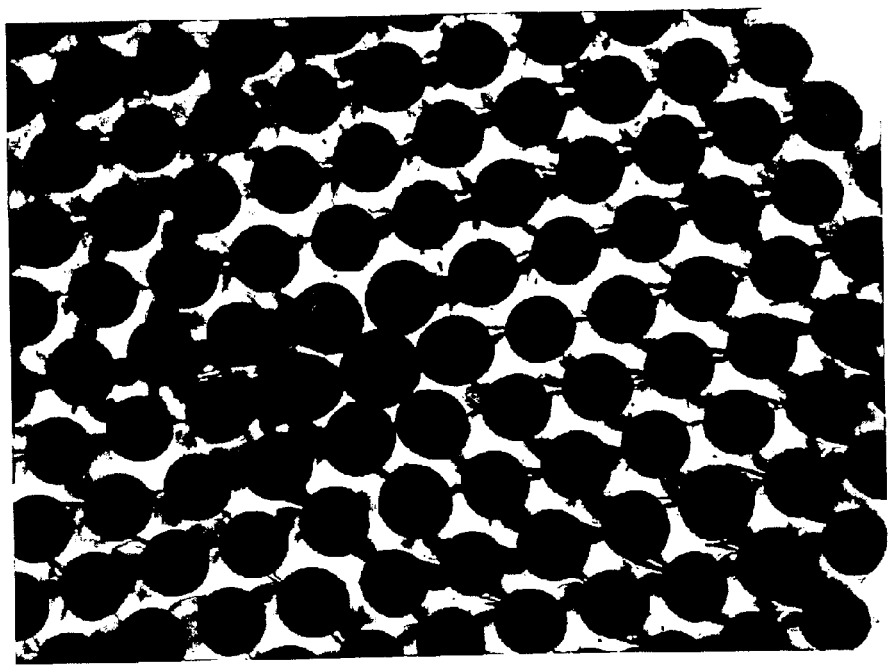
FIG. 9 is an end view of a microstructured optical fiber preform according to an embodiment of the present invention.
Figure 10:
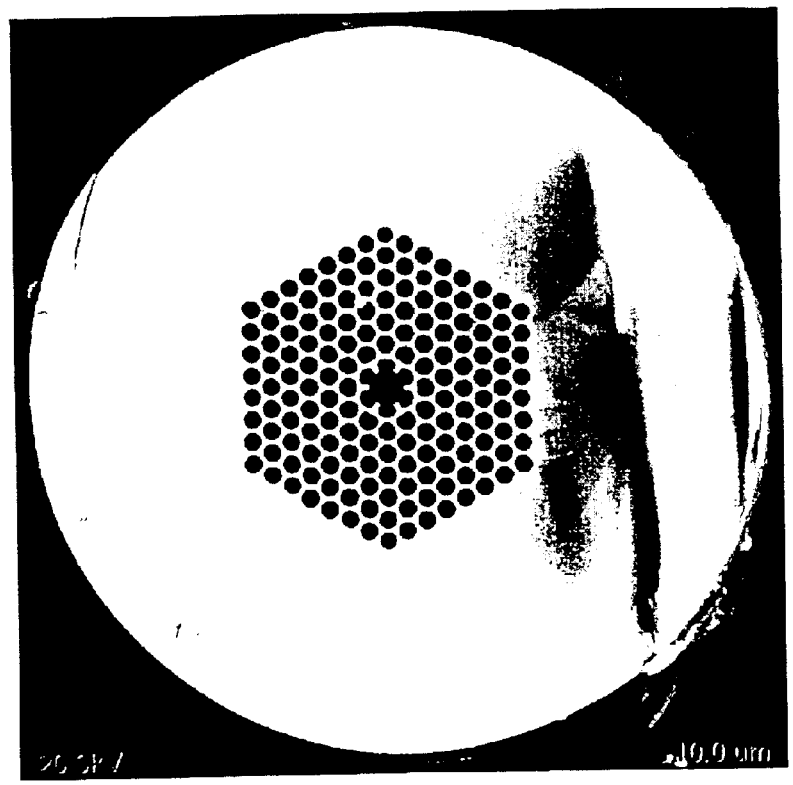
FIG. 10 is an end view of a microstructured optical fiber according to an embodiment of the present invention.

A microstructured optical fiber preform according to the present invention was constructed as described above using undoped silica capillaries and a 6 wt % $B_2O_3$-doped silica sleeve tube. This preform, shown in end view in FIG. 9, was similar to the preform shown in Example 3, with the silica capillaries forming the inner region, and the boron-doped silica sleeve tube forming the outer region. The softening point temperature difference between the materials of the inner region and the outer region is about 160° C. This preform was drawn into optical fiber at a furnace temperature of 1950° C. The optical fiber drawn from the preform of FIG. 9 is shown in end view in FIG. 10. The core hole and photonic crystal lattice of the microstructured optical fiber of FIG. 10 are substantially undistorted compared to the holes of the preform. For example, the holes of the photonic crystal lattice are round and remain at the hexagonal lattice points, and the protruding ribs of the core hole survived the draw with only minor distortion.

It will be apparent to those skilled in the art that various modifications and variations can be made to the present invention without departing from the spirit and scope of the invention. For example, in the production of a dual-core photonic band gap fiber having two core capillaries, both core holes may be coupled to a first pressure system. While the invention has been described above with respect to one, two or three pressure systems, the skilled artisan will recognize that more pressure systems may be used in practicing the invention. Thus, it is intended that the present invention cover the modifications and variations of this invention provided they come within the scope of the appended claims and their equivalents.

What is claimed is:

1. A microstructured optical fiber for the propagation of an optical signal having a desired wavelength, the microstructured optical fiber comprising:
   an inner region including an inner material and a plurality of holes formed in the inner material, the inner material having a refractive index at the desired wavelength and a softening point temperature; and
   an outer region disposed about the inner region, the outer region including an outer material surrounding the inner region the outer material having a refractive index at the desired wavelength and a softening point temperature,
   wherein the softening point temperature of the inner material is greater than the softening point temperature of the outer material by at least about 50° C.

2. The microstructured optical fiber of claim 1 wherein the inner region includes a core.

3. The microstructured optical fiber of claim 1 wherein the softening point temperature of the inner material is greater than the softening point temperature of the outer material by at least about 100° C.

4. The microstructured optical fiber of claim 1 wherein the softening point temperature of the inner material is greater than the softening point temperature of the outer material by at least about 150° C.

5. The microstructured optical fiber of claim 1 wherein the inner material and the outer material have an absolute value of delta of less than about 0.4% at the desired wavelength of the inner material.

6. The microstructured optical fiber of claim 1 wherein the outer material has substantially no holes formed therein.

7. The microstructured optical fiber of claim 1, wherein the inner material and the outer material are individually selected from the group consisting of silica glasses, doped silica glasses, fluoride glasses, chalcogenide glasses and heavy metal oxide glasses.

8. The microstructured optical fiber of claim 1, wherein the outer material includes a softening point temperature reducing dopant.

9. The microstructured optical fiber of claim 8, wherein the outer material further includes a second dopant to compensate for a refractive index change caused by the softening point temperature reducing dopant.

10. The microstructured optical fiber of claim 9, wherein the softening point temperature reducing dopant is selected from the group consisting of fluorine, germanium, boron, phosphorus, and mixtures thereof.

11. The microstructured optical fiber of claim 1, wherein the inner material includes a softening point temperature increasing dopant.

12. The microstructured optical fiber of claim 11, wherein the softening point temperature increasing dopant is selected from the group consisting of tantalum, nitrogen and mixtures thereof.

13. The microstructured optical fiber of claim 1 wherein the outer material is in substantially in contact with an outer surface of the inner material.

14. The microstructured optical fiber of claim 1 wherein the microstructured optical fiber has a central axis, and wherein the inner material is disposed substantially along the central axis.

15. The microstructured optical fiber of claim 1 wherein the plurality of holes in the inner region comprises at least two rings of holes surrounding the core.

16. The microstructured optical fiber of claim 1, wherein the plurality of holes in the inner region comprises at least four rings of holes surrounding the core.

17. The microstructured optical fiber of claim 1 wherein the inner region has a mass, the outer region has a mass, and the mass of the outer region is substantially greater than the mass of the inner region.

18. The microstructured optical fiber of claim 17 wherein the mass of the outer region is at least about three times the mass of the inner region.

19. The microstructured optical fiber of claim 1, wherein the core comprises a hole formed in the inner material.

20. The microstructured optical fiber of claim 1, wherein the core is formed substantially from a solid material.

21. An optical communications system including the microstructured optical fiber of claim 1.

22. A microstructured optical fiber preform for the fabrication of a microstructured optical fiber, the microstructured optical fiber being for the propagation of an optical signal at a desired wavelength, the microstructured optical fiber preform comprising:
   an inner region including an inner material and a plurality of holes formed in the inner material, the inner material having a refractive index at the desired wavelength and a softening point temperature; and
   an outer region disposed about the inner region, the outer region including an outer material surrounding the inner region, the outer material having a refractive index at the desired wavelength and a softening point temperature,
   wherein the softening point temperature of the inner material is greater than the softening point temperature of the outer material by at least about 50° C.

23. The microstructured optical fiber preform of claim 22 wherein the softening point temperature of the inner material is greater than the softening point temperature of the outer material by at least about 100° C.

24. The microstructured optical fiber preform of claim 22 wherein the softening point temperature of the inner material is greater than the softening point temperature of the outer material by at least about 150° C.

25. The microstructured optical fiber preform of claim 22 wherein the inner material and the outer material have an absolute value of delta of less than about 0.4% at the desired wavelength of the inner material.

26. The microstructured optical fiber preform of claim 22, wherein the inner material and the outer material are individually selected from the group consisting of silica glasses, doped silica glasses, fluoride glasses, chalcogenide glasses and heavy metal oxide glasses.

27. The microstructured optical fiber preform of claim 22 wherein the outer material is in substantial contact with an outer surface of the inner material.

28. The microstructured optical fiber preform of claim 22 wherein the microstructured optical fiber has a central axis, and wherein the inner material is disposed substantially along the central axis.

29. The microstructured optical fiber preform of claim 22 wherein the inner region has a mass, the outer region has a mass, and the mass of the outer region is substantially greater than the mass of the inner region.

30. The microstructured optical fiber preform of claim 29 wherein the mass of the outer region is at least about three times the mass of the inner region.

31. A method of making a microstructured optical fiber, comprising the steps of:
providing a preform, the preform having
an inner region including a core, an inner material and a plurality of holes formed in the inner material, the inner material having a refractive index at the desired wavelength and a softening point temperature, and
an outer region disposed about the inner region, the outer region including an outer material surrounding the inner region, the outer material having a refractive index at the desired wavelength and a softening point temperature,
wherein the softening point temperature of the inner material is greater than the softening point temperature of the outer material by at least about 50° C.; and drawing the preform to form the microstructured optical fiber.

32. The method of claim 31 wherein the preform is drawn at an actual drawing temperature, and wherein the inner material is characterized by a first drawing temperature and the outer material is characterized by a second drawing temperature, and the actual drawing temperature is substantially closer to the second drawing temperature than to the first drawing temperature.

33. The method of claim 31 wherein the softening point temperature of the inner material is greater than the softening point temperature of the outer material by at least about 100° C.

34. The method of claim 31 wherein the softening point temperature of the inner material is greater than the softening point temperature of the outer material by at least about 150° C.

35. The method of claim 31 wherein the outer material is in substantial contact with an outer surface of the inner material.

36. The method of claim 31 wherein the microstructured optical fiber has a central axis, and wherein the inner material is disposed substantially along the central axis.

37. The method of claim 31 wherein the inner region has a mass, the outer region has a mass, and the mass of the outer region is substantially greater than the mass of the inner region.

38. The method of claim 37 wherein the mass of the outer region is at least about three times the mass of the inner region.

* * * * *